(12) United States Patent
More et al.

(10) Patent No.: US 10,549,823 B2
(45) Date of Patent: Feb. 4, 2020

(54) DAMPER MOUNT

(71) Applicant: Mascorp, Ltd., Houston, TX (US)

(72) Inventors: George More, Houston, TX (US); Aad Dijkshoorn, Houston, TX (US)

(73) Assignee: Mascorp, Ltd., Houston, TX (US)

( * ) Notice: Subject to any disclaimer, the term of this patent is extended or adjusted under 35 U.S.C. 154(b) by 0 days.

(21) Appl. No.: 15/685,181

(22) Filed: Aug. 24, 2017

(65) Prior Publication Data

US 2018/0297673 A1    Oct. 18, 2018

Related U.S. Application Data

(60) Provisional application No. 62/379,140, filed on Aug. 24, 2016.

(51) Int. Cl.
| | |
|---|---|
| *F16M 13/00* | (2006.01) |
| *B63B 39/00* | (2006.01) |
| *B63B 17/00* | (2006.01) |
| *F16F 15/12* | (2006.01) |
| *B63H 21/30* | (2006.01) |

(52) U.S. Cl.
CPC ........ *B63B 39/005* (2013.01); *B63B 17/0081* (2013.01); *F16F 15/1203* (2013.01); *B63H 21/305* (2013.01)

(58) Field of Classification Search
CPC .. F16F 1/3732; F16F 7/00; F16F 15/02; F16F 15/04; F16F 1/377; F16F 1/376; F16F 1/38; F16F 1/3849

USPC ............... 248/342, 343, 609, 611, 613, 614

See application file for complete search history.

(56) References Cited

U.S. PATENT DOCUMENTS

| | | | | |
|---|---|---|---|---|
| 4,516,749 A * | 5/1985 | Sullivan | ............. | F16L 5/00 |
| | | | | 248/345 |
| 5,743,509 A * | 4/1998 | Kanda | ............. | F16F 1/38 |
| | | | | 248/634 |
| 6,076,794 A * | 6/2000 | Pradel | ............. | B60G 13/003 |
| | | | | 248/636 |
| 7,316,389 B2 * | 1/2008 | Rawson | ............. | F16F 1/3732 |
| | | | | 267/141.5 |
| 8,091,849 B2 * | 1/2012 | Ayadhi | ............. | F16F 15/08 |
| | | | | 248/317 |
| 8,342,475 B2 * | 1/2013 | Tsakiris | ............. | A63B 69/201 |
| | | | | 248/343 |
| 2014/0299736 A1 * | 10/2014 | Itou | ............. | B60G 13/003 |
| | | | | 248/611 |

OTHER PUBLICATIONS http://duomar.com/duomount.php. "Doumount Anti-Vibration Mounting System." Dated Aug. 8, 2016.
HiLBiG fastener type HG 40 brochure.

* cited by examiner

*Primary Examiner* — Steven M Marsh
(74) *Attorney, Agent, or Firm* — Tumey L.L.P.

(57) ABSTRACT

A system and method dampen sound. In one embodiment, the system is a damping system that has a first damper. The damping system also has a second damper. In addition, the damping system has a false ceiling bracket. Moreover, the damping system has an assembly bushing. The damping system also has a positioning ring.

10 Claims, 3 Drawing Sheets

DAMPER MOUNT

CROSS-REFERENCE TO RELATED APPLICATIONS

This application is a non-provisional of U.S. application Ser. No. 62/379,140 filed on Aug. 24, 2016, which is incorporated by reference herein in its entirety.

BACKGROUND OF THE INVENTION

Field of the Invention

This invention relates to the field of vibration damping and more specifically to the field of damping mounts.

Background of the Invention

Marine vessels often use ample power for operation. Oftentimes, noise is a by-product of the various devices and equipment used onboard in order to power, and maintain a steady-state of performance, for a vessel. The operation of equipment, such as, for example, equipment utilized in the marine environments, and additionally for building construction, including: motors, generators, air compressors, boilers, fans, pumps, propellers, shafts, struts, bearings, and the like, may cause disruptive noises and vibrations within a surrounding environment.

The Occupational Safety and Health Administration (OSHA) is a regulatory agency of the United States government that has administered a permissible exposure limit concerning an acceptable noise level that people may experience. With the combination of different pieces of equipment running in operation, noise and vibration levels may exceed these permissible exposure limits. Different approaches may be taken to attempt to reduce these levels such as, isolating vibrating machinery, design and layout of the workplace for low noise emission, and adding material to a source of noise. Onboard marine vessels, space is usually limited. Rather than affecting the sources of the noise and vibrations, a system or device may alter the subsequent acoustics produced from operation.

Therefore, there is a need for a damping system that may protect people from noise and vibrations.

BRIEF SUMMARY OF SOME OF THE PREFERRED EMBODIMENTS

These and other needs in the art are addressed in one embodiment by a damping system. The damping system includes a first damper. The damping system also includes a second damper. In addition, the damping system includes a false ceiling bracket. Moreover, the damping system includes an assembly bushing. The damping system further includes a positioning ring.

These and other needs in the art are addressed in an embodiment by a method for assembling a damping system. The method includes inserting an end of a first damper comprising an extension through an opening of a false ceiling bracket. The method also includes inserting an end of a second damper comprising an extension through an opposite side of the opening of the false ceiling bracket. Moreover, the method includes aligning the extensions. The method further includes inserting an assembly bushing through the first and second dampers. The method additionally includes placing a positioning ring around a portion of the assembly bushing. In addition, the method includes fastening the positioning ring.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The present disclosure may relate to the damping of vibrations and noises attributed to equipment, such as, for example equipment used in a marine environment (e.g., vessels utilized in bodies of water) or building construction. In a marine environment, boat propellers, shafts, struts, bearings, engines and pumps may be sources of disruptive noises and vibrations. Additionally, vessels (e.g., boats, ships, submarines, hovercrafts) that move through a body of water (e.g., oceans, lakes, rivers) may encounter turbulence due to weather conditions (e.g., waves, wind, rain), which may cause noises and vibration within the vessels.

The acoustics, mechanical waves that travel through states of matter, that may be produced on and/or travel through marine vessels may not be acceptable for people to experience when compared to international habitability standards. In an embodiment, a damping system 100, as shown in FIG. 5, may be installed in an environment affected by acoustic waves characterized by large amplitudes in order to alter the noise and vibration levels of the acoustic waves.

Figure 5:
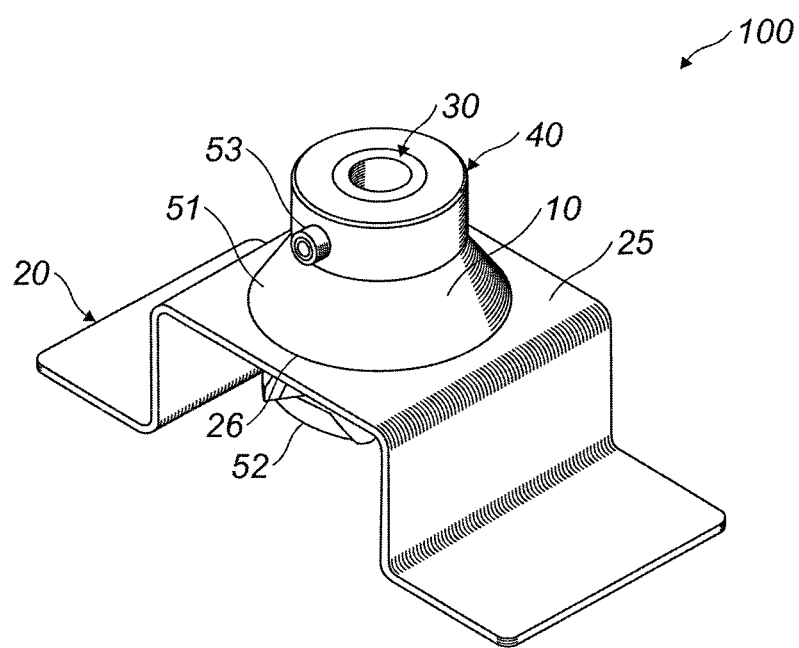
FIG. 5 illustrates a damping system in accordance with embodiments of the present disclosure.

As shown in FIG. 5, damping system 100 may reduce vibrations and noise transmitted through various structures (e.g., a superstructure). As acoustic waves propagate through different mediums, there may be thermal consumption of the energy of the acoustic waves caused by the density of the medium. Damping system 100 may protect people from unwanted noise and vibrations by absorbing energy as acoustic waves travel through damping system 100. Damping system 100 may be utilized for a quick installation of ceilings that may be decoupled from vibration and/or noise in all directions. Damping system 100 may assist in bringing noise and/or vibration levels to acceptable levels specified by OSHA. Without limitation, damping system 100 may be utilized for ceiling, floor, and wall fixtures; insulation systems; wooden deck fastening, mounting plates, flat bars, wiring systems, anti-skid, or combinations thereof. Damping system 100 may also be utilized for steel and/or aluminum shipbuilding. Additionally, damping system 100 may reduce structural noise and vibration transmission in ceilings and walls in the shipbuilding industry and the building construction industry. Furthermore, damping system 100 may prevent structural noises and vibrations from transferring to the interior of a vessel (e.g., boats, ships, submarines, hovercrafts).

In embodiments of the present disclosure as shown in FIG. 5, damping system 100 may comprise a damper 10, a false ceiling bracket 20, an assembly bushing 30, and a positioning ring 40. The damping system 100 may be attached to a ceiling, floor, wall, or any other suitable location.

Figure 1:
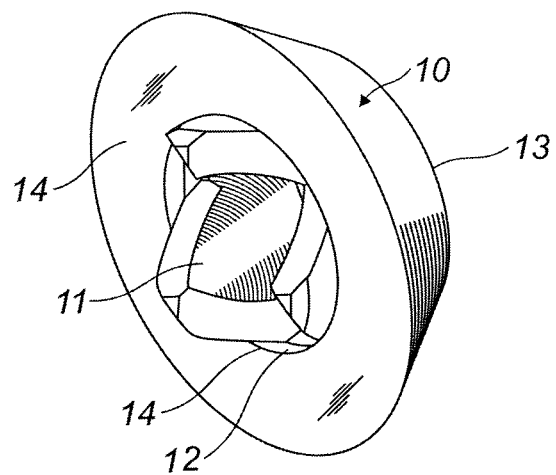
FIG. 1 illustrates a damper in accordance with embodiments of the present disclosure.

FIG. 1 illustrates an embodiment of damper 10. Damper 10 may serve as the principal damping component within damping system 100. There may be a plurality of dampers 10 within damping system 100. Damper 10 may be solid and/or include an opening 12 that runs completely through damper 10. Damper 10 may be of any suitable three dimensional shape, such as, for example, pyramidal, toroidal, spherical, cubical, conical, cylindrical or combinations thereof. In embodiments, damper 10 may be conical and have two flat ends 13, 14. Damper 10 may comprise of any suitable material. Suitable material may comprise of rubber, metals, polymers, composites and/or combinations thereof. Without limitation, in embodiments, damper 10 may comprise of natural rubber, synthetic rubber, polytetrafluoroethylene, polyurethane, grey cast iron, shape memory alloys and/or combinations thereof. The efficiency of acoustic absorption and/or attenuation may be based on the density of damper 10. In embodiments, damper 10 may have densities ranging from about 0.25 kg/m$^2$ to about 10.0 kg/m$^2$. Without limitation, the density may range from about 0.25 kg/m$^2$ to about 2.0 kg/m$^2$, from about 2.0 kg/m$^2$ to about 5.0 kg/m$^2$, from about 5.0 kg/m$^2$ to about 7.0 kg/m$^2$, from about 7.0 kg/m$^2$ to about 10.0 kg/m$^2$, or from about 0.5 kg/m$^2$ to about 2.5 kg/m$^2$. In embodiments, damper 10 may be reversible and may be identical on both ends, which may allow for easy installation and fewer parts.

Damper 10 may include an interlock design on one end, wherein the interlock design may comprise an extension 11. There may be a singular extension 11 or a plurality of extensions 11. Extensions 11 may be designed and manufactured at a plurality of lengths and angles. A set of dampers 10 may comprise of mirroring interlock designs on one end of each individual piece. A set of dampers 10 (e.g., first damper 51 and second damper 52 shown in FIG. 5) may be disposed upon each other by aligning each individual piece's extensions 11. Disposing one damper 10 upon another may "sandwich" or squeeze false ceiling bracket 20 between them.

Figure 2:
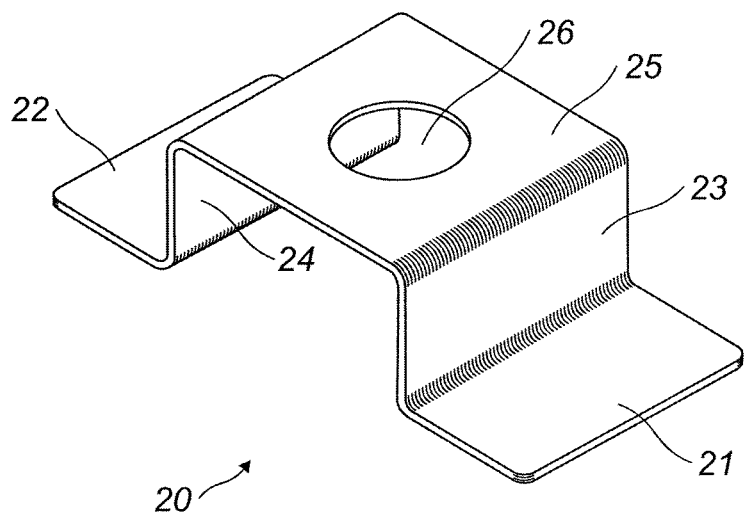
FIG. 2 illustrates a false ceiling bracket in accordance with embodiments of the present disclosure.

FIG. 2 illustrates an embodiment of false ceiling bracket 20. False ceiling bracket 20 may be any intermediary component designed for structurally fixing one part to another (e.g. structural brackets and hangers). False ceiling bracket 20 may serve to affix damping system 100 to a floor, wall, ceiling, and/or any other suitable location. False ceiling bracket 20 may be affixed through suitable fasteners. Without limitation, suitable fasteners may be nuts and bolts, washers, screws, socket set screws, pins, sockets, rods and studs, hinges and/or any combination thereof. False ceiling bracket 20 may be made of any suitable material. Suitable material may include metals, nonmetals, polymers, ceramics, composites and/or combinations thereof. False ceiling bracket 20 may comprise a first leg 21, a second leg 22, a first vertical support 23, a second vertical support 24, a top 25, and a first opening 26.

In embodiments, first leg 21 may be disposed about perpendicularly to first vertical support 23. Second leg 22 may be disposed about perpendicularly to second vertical support 24. First leg 21 and second leg 22 may be used interchangeably, as may first vertical support 23 and second vertical support 24. In embodiments, top 25 is disposed about perpendicular to first vertical support 23 and second vertical support 24. First vertical support 23 and second vertical support 24 may be disposed on opposing sides of top 25. In embodiments, first vertical support 23 is disposed between top 25 and second leg 22, and second vertical support 24 is disposed between top 25 and second leg 22. Top 25 may be disposed atop first vertical support 23 and second vertical support 24. False ceiling bracket 20 may have any suitable height. In embodiments, false ceiling bracket 20 may have a height of about ten millimeters to about fifty millimeters from the horizontal plane of first leg 21 and second leg 22. Without limitation, the height of false ceiling bracket 20 may range from about ten millimeter to about twenty millimeters, from about twenty-five millimeters to about fifty millimeters, from about twenty millimeters to about thirty millimeters, from about thirty millimeters to about forty millimeters, and from about forty millimeters to about fifty millimeters. Without limitation, each of the aforementioned components of false ceiling bracket 20 may be manufactured and assembled using a brake press and/or welding. Top 25 may comprise a first opening 26. First opening 26 may be disposed at about the center of top 25. First opening 26 may be an absence of material. There may be a plurality of first openings 26 disposed throughout false ceiling bracket 20. First opening 26 may be any suitable shape. Without limitation, a suitable shape may be circular, elliptical, triangular, rectangular, square, hexagonal and/or any combination thereof. In embodiments, first opening 26 is circular. First opening 26 may have a diameter large enough to allow extensions 11 of damper 10 to pass through top 25.

Figure 3:
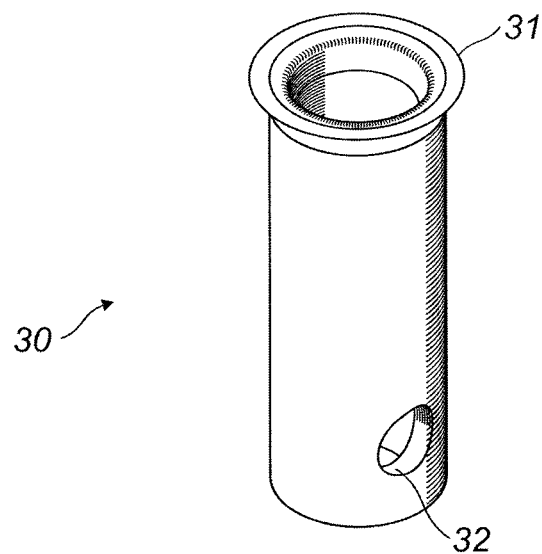
FIG. 3 illustrates an assembly bushing in accordance with embodiments of the present disclosure.

To hold a set of dampers 10 disposed upon each other on opposite and/or the same sides of false ceiling bracket 20, assembly bushing 30 may be utilized, as illustrated in FIG. 3. In embodiments, dampers 10 may have an opening 15 that runs through them. Assembly bushing 30 may be inserted into the combined length of the openings of dampers 10 in order to provide a bearing surface. Without limitation, assembly bushing 30 may be a solid sleeve bushing, a flanged bushing, a split bushing, a clenched bushing and/or combinations thereof. Assembly bushing 30 may be made of any suitable material. Suitable material may include metals, nonmetals, polymers, ceramics, composites and/or combinations thereof. Assembly bushing 30 may comprise a lip 31 and a second opening 32. In embodiments, assembly bushing 30 is a flanged bushing, wherein lip 31 may serve to support a set of dampers 10. Lip 31 may be a flared, outer edge of an end of assembly bushing 30. Second opening 32 may be disposed near the end of assembly bushing 30 that is opposite from lip 31. Second opening 32 may be an absence of material. Second opening 32 may be any suitable size and shape. Without limitation, a suitable shape may be circular, elliptical, triangular, rectangular, square, hexagonal and/or any combination thereof. To hold assembly bushing 30 in place, positioning ring 40 may be used.

Figure 4:
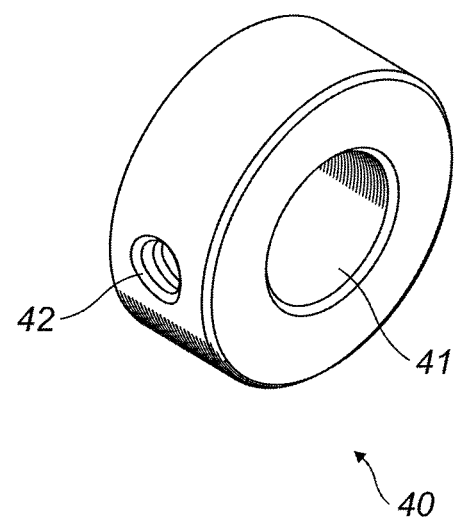
FIG. 4 illustrates a positioning ring in accordance with embodiments of the present disclosure.

FIG. 4 illustrates an embodiment of positioning ring 40. Positioning ring 40 may be used to secure assembly bushing 30 to a set of dampers 10 by adjusting its diameter through the use of fasteners. Positioning ring 40 may be made of any suitable material. Suitable material may include metals, nonmetals, polymers, ceramics, composites and/or combinations thereof. Positioning ring 40 may be any suitable shape. Without limitation, a suitable shape may be circular, elliptical, triangular, rectangular, square, hexagonal and/or any combination thereof. Positioning ring 40 may comprise a first hole 41 and a second hole 42. First hole 41 may be an absence of material that runs through the length of positioning ring 40. First hole 41 may be disposed in the center of positioning ring 40. Consequently, there may be an inner and outer diameter for positioning ring 40. In embodiments, first hole 41 may be of sufficient diameter to allow assembly bushing 30 to be disposed therein. In an embodiment, first hole 41 may have a diameter between about 0.1% and 2.0% greater than the outer diameter of assembly bushing 30, alternatively a diameter between about 0.1% and about 1.0% greater than the outer diameter of assembly bushing 30, and alternatively a diameter between about 1.0% and about 2.0% greater than the outer diameter of assembly bushing 30, further alternatively a diameter between about 1.0% and about 1.5% greater than the outer diameter of assembly bushing 30, and alternative about the same diameter as the outer diameter of assembly bushing 30. In embodiments, positioning ring 40 may be disposed around at least a portion of assembly bushing 30 by inserting assembly bushing 30 through first hole 41. Consequently, such disposition may limit the movement of positioning ring 40 along two separate axes. Second hole 42 may be an absence of material that extends radially from the inner diameter of positioning ring 40 to the outer diameter of positioning ring 40. There may be a plurality of second holes 42. Second hole 42 may be a location for a suitable fastener. Without limitation, a suitable fastener may be nuts and bolts, washers, screws, pins, sockets, rods and studs, hinges and/or any combination thereof. The tightening or loosening of a suitable fastener may increase or decrease the diameter of positioning ring 40. In embodiments, a fastener may be inserted into second hole 42 in order to secure positioning ring 40 from translating along the length of assembly bushing 30.

FIG. 5 illustrates an embodiment of damping system 100. Damping system 100 may comprise a first damper 51 and a second damper 52. First damper 51 may be disposed on the top of top 25 of false ceiling bracket 20. The extensions 11 (not shown) on the bottom of first damper 51 may be inserted through the top of first opening 26. Second damper 52 may be disposed underneath top 25 and first damper 51. In an embodiment, extensions 11 (not shown) of second damper 52 may substantially mirror those of first damper 51. In other embodiments, such extensions 11 are different. The end of second damper 52 with extensions 11 (not shown) may also pass through first opening 26 from underneath, wherein both sets of extensions 11 (not shown) may align. Assembly bushing 30 may be inserted into first damper 51 and second damper 52 through the openings 15. The end of assembly bushing 30 with second opening 32 may be inserted first through second damper 52 disposed underneath top 25. Once fully inserted, lip 31 may lay flush with a portion of second damper 52. Positioning ring 40 may be disposed around assembly bushing 30 near the end with second opening 32. This may allow positioning ring 40 to only rotate along a singular axis. Second opening 32 and second hole 42 may be aligned in order for a fastener 53 to be inserted to secure positioning ring 40 in place. Once a fastener 53 is inserted, positioning ring 40 may be disposed about flush with an end of first damper 51. In embodiments, there may be a plurality of holes located on first leg 21 and second leg 22 where fasteners may be inserted. In embodiments, the fasteners may secure damping system 100 to the floor, wall, ceiling, and/or any other suitable location.

In other embodiments, the end of assembly bushing 30 with second opening 32 may be inserted into the opening of first damper 51 and second damper 52 through the top of first damper 51, which is disposed on top of top 25 of false ceiling bushing 20. The previous steps for assembly may be the same except that positioning ring 40 may lay flush with an end of second damper 52, and lip 31 may lay flush with a portion of first damper 51 that is disposed on top of top 25.

In other embodiments, false ceiling bracket 20 may have a plurality of bending members, without limitation. First openings 26 may be disposed upon these bending members, wherein a plurality of sets of dampers 10 may be disposed upon.

In embodiments, there may be a plurality of damping systems 100 installed in an environment (i.e. different rooms within a marine vessel). Each individual damping system 100 may be coupled to a wall, floor, ceiling, each other and/or combinations thereof to reduce the noise and vibrations in the given surroundings.

In an embodiment, damping system 100 is assembled individually or in a group. In embodiments, damping system 100 is assembled in a group and further includes externally connecting each damping system together.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A damping system comprising:
   a first damper;
   a second damper, wherein both the first damper and the second damper each have at least one extension at an end;
   a false ceiling bracket, wherein the false ceiling bracket comprises a top, wherein the top comprises a hole, wherein the first damper and the second damper are disposed on opposing sides of the top, wherein each of the at least one extensions are disposed through the hole and interlock with each other;
   an assembly bushing; and
   a positioning ring.

2. The damping system of claim 1, wherein the first damper and the second damper comprise rubber.

3. The damping system of claim 1, wherein the first damper and the second damper have densities from about 0.5 kg/m² to about 2.5 kg/m².

4. The damping system of claim 1, wherein the first damper and the second damper each have an opening.

5. The damping system of claim 1, wherein the first damper and the second damper each comprise a plurality of extensions.

6. The damping system of claim 1, wherein the false ceiling bracket has a height of about 25 millimeters to about 50 millimeters.

7. The damping system of claim 1, wherein the assembly bushing comprises a solid sleeve bushing, a flanged bushing, a split bushing, or a clenched bushing.

8. The damping system of claim 1, wherein the assembly bushing comprises a lip.

9. The damping system of claim 1, wherein the positioning ring comprises a first hole.

10. The damping system of claim 9, wherein the positioning ring comprises a second hole.

* * * * *